July 8, 1930.  J. D. MORGAN  1,770,363
WINDSHIELD CLEAR VISION METHOD AND DEVICE
Filed July 25, 1927  2 Sheets-Sheet 1
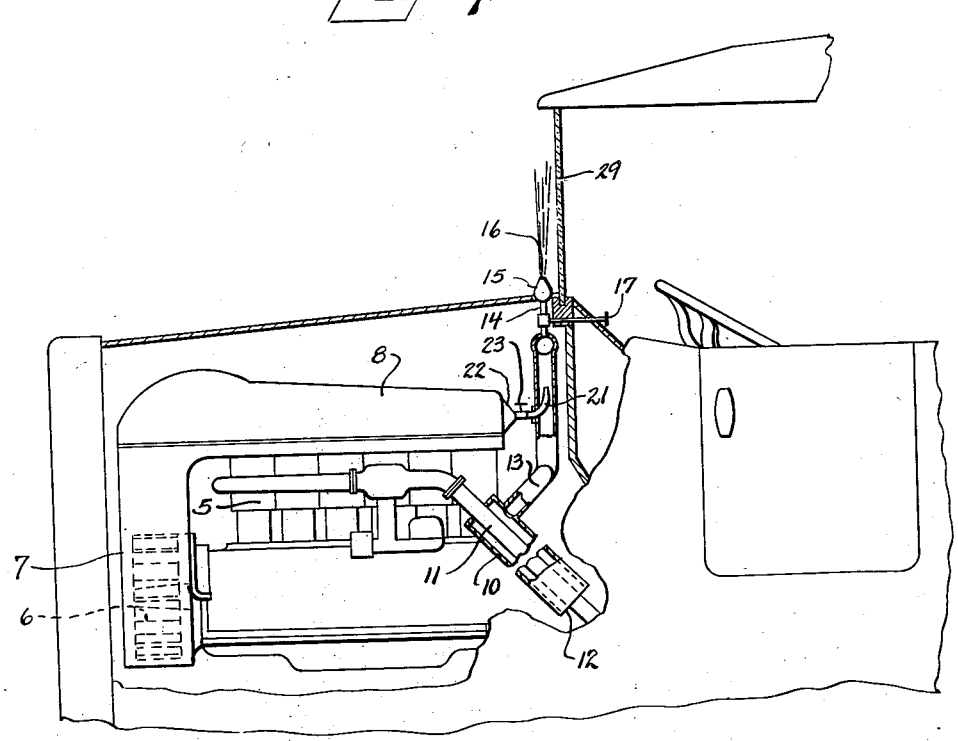
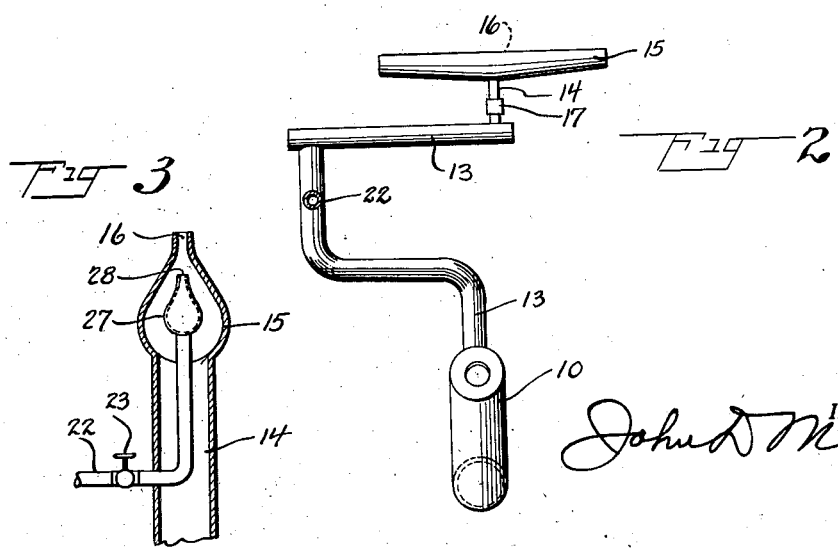
INVENTOR.
John D. Morgan July 8, 1930. J. D. MORGAN 1,770,363
WINDSHIELD CLEAR VISION METHOD AND DEVICE
Filed July 25, 1927 2 Sheets-Sheet 2
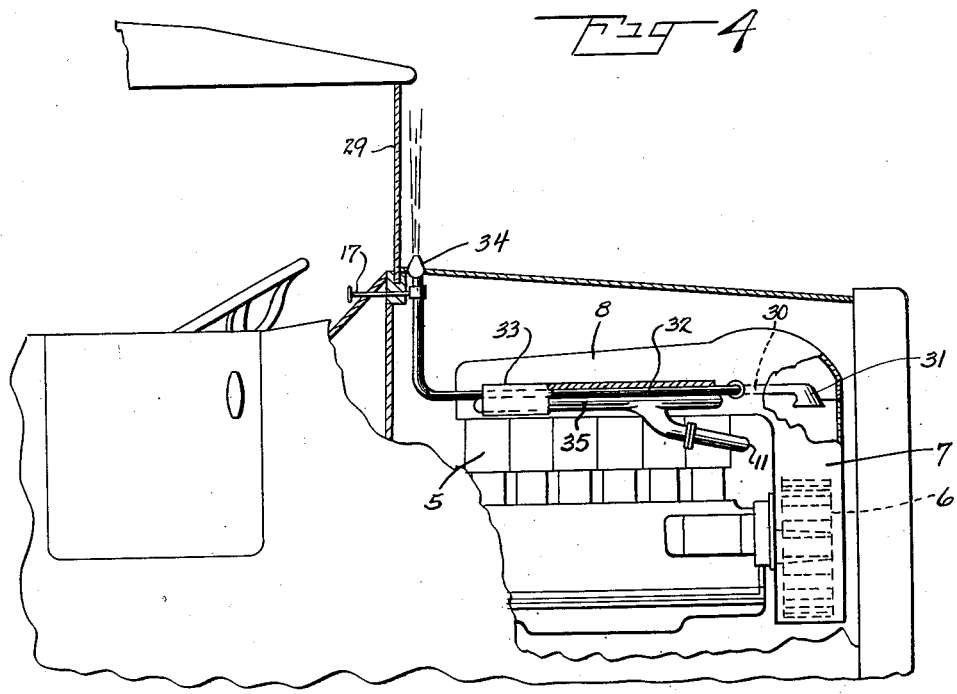
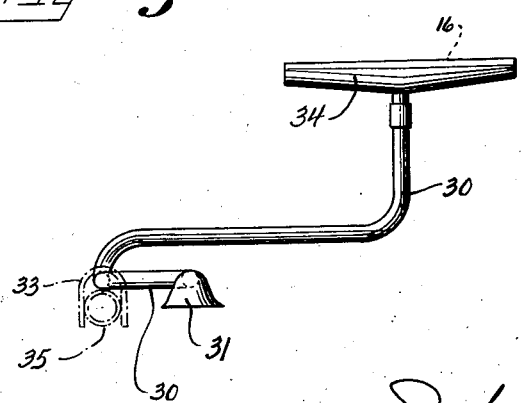
INVENTOR.
John D. Morgan Patented July 8, 1930

1,770,363

UNITED STATES PATENT OFFICE

JOHN D. MORGAN, OF SUMMIT, NEW JERSEY

WINDSHIELD CLEAR-VISION METHOD AND DEVICE

Application filed July 25, 1927. Serial No. 208,399.

The invention relates to a weather protection method and means applicable to windshields of vehicles and ships driven by air-cooled internal combustion engines, and in certain of its aspects to other engines as well.

Objects and advantages will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, improvements and method herein shown and described.

The accompanying drawings, referred to herein and constituting a part hereof, illustrate one embodiment of the invention, and together with the description, serve to explain the principles of the invention.

Of the drawings:—

Fig. 1 is a fragmentary elevation, with parts in section, of a motor car with the present invention applied thereto;

Fig. 2 is a detailed view of the form of weather protector shown in Fig. 1;

Fig. 3 is a fragmentary sectional view of a modification of said device;

Fig. 4 is a similar view to Fig. 1 but showing a different form of the device; and Fig. 5 is a detached view of the form of weather protector shown in Fig. 4.

The invention is directed to providing protection from the weather for wind-shields and windows of motor cars and other automotive machines utilizing heat engines and air cooling means therefor, the invention providing means for heating air and utilizing an air current provided primarily for cooling the engine to project a sheet of the heated air in front of a wind-shield or window to deflect therefrom and prevent the deposition thereon of rain, snow, or frost, also to vaporize these vision-obscuring elements. The invention is shown herein applied to the Franklin automobile engine and air-cooling system, although it will be understood that it has other applications of widely varying forms, to aeroplanes, dirigibles, and water-borne craft.

Referring to the embodiment of the invention illustrated by way of example in the accompanying drawings and referring for the present more particularly to Figs. 1 to 3, a six-cylinder internal combustion engine 5, is shown having an air-cooling system, comprising a fan 6 within a housing 7. Said housing leads into an overhead duct 8, which is provided with means for directing air currents downwardly along the surfaces of the engine cylinders. This mechanism illustrates generally the motive power unit of the well-known Franklin automobile, and need not be described in detail. It will be understood, however, that this particular application is exemplary and not restrictive of the invention.

In the embodiment shown in Figs. 1 to 3, means are provided for heating a body of air by conduction from the exhaust gases of the engine, and a current of air is taken from the air-cooling system of the engine to project a sheet of the heated air in front of the wind-shield of the motor car, or other window, to be protected from the weather. It will be understood that the position or direction of the sheet of protective air may be varied, or more than two such sheets may be employed, as shown in my copending application S. N. 105,955 filed May 1, 1926, this present application in certain of its features being in the nature of an improvement upon my said copending application.

In said embodied form a jacket 10 is mounted about the exhaust pipe 11 of the engine 5, this jacket being open at its bottom end 12 to provide an air intake. From the upper part of the jacket 11, a pipe 13 extends upwardly connecting at the top end thereof with a pipe 14 which communicates with an elongated chamber 15 provided with a long and narrow discharge opening 16 through which the hot air is ejected in a sheet. There is provided a valve or other control 17, preferably of the gate-valve type, for shutting off the device when desired.

The form of air current creating or accelerating means shown in Fig. 1 comprises a nozzle 21, located within the pipe 13 and pointing outwardly, this nozzle connecting with the air-duct 8 of the engine-cooling system, preferably by conical conduit 22, and may be provided with a valve 23 if desired.

This device operates substantially on the ejector principle, and may be of such size and shape in all its parts as is best adapted to project a swiftly moving sheet of hot air from the slot-like orifice 16. In Fig. 3 a modification is shown, wherein instead of the ejector nozzle 21, an elongated chamber 27 is located within but spaced away from the interior walls of chamber 15. Chamber 27 communicates with the pipe 22 and thereby with the air-duct 8. The chamber 27 is provided with a long and narrow discharge orifice 28 just within the discharge orifice 16 of the chamber 15, but much narrower and spaced away from the edges of orifice 16. It may extend nearly the full length of the chamber 15. These exemplary devices are used, as stated to project at high velocity a sheet of hot air in front of the wind-shield or window 29, this sheet of air not only vaporizing snow, sleet or rain, but mechanically deflecting it from its path so that it is prevented from coming in contact with the wind-shield or window both by the heat and resultant vaporization and the mechanical deflection as described.

In the form shown in Figs. 4 and 5 the entire current of air is taken from the air-cooling system of the engine, and is preferably thereafter further heated by conduction from the parts of the engine. As embodied, a pipe 30 has a conoidal intake 31, which may be of suitable and efficient shape and size to produce the proper degree of pressure and current. The pipe 30 passes out of the air conduit 8 and 32 rests upon the exhaust manifold 35 of the engine, and is preferably provided with a heat-retaining jacket or hood 33. The pipe is then directed to the wind-shield, and is provided with a proper discharge device 34, which may be conveniently of the form of the device 15, already described, for projecting the sheet of hot air across and in front of the windshield.

The invention in its broader aspects is not limited to the specific mechanism shown and described, but departures may be made therefrom within the scope of the accompanying claims without departing from the principles of the invention and without sacrificing its chief advantages.

What I claim is:—

1. In combination in a windshield weather protector an elongated chamber having a supply pipe for air and a longitudinally disposed slot therein for discharging a sheet of air, and a chamber within said first-mentioned chamber having a supply pipe for fluid under pressure and a discharge slot for a sheet of air within and in register with the slot in said first-mentioned chamber.

2. The combination with an air-cooled internal combustion engine having means for driving a cooling air current over the engine cylinders of a windshield clear vision device, having air-conveying means connected to said air-current creating means, and means for heating air by conduction from the exhaust gases of the engine and devices for driving a sheet of heated air in front of a windshield.

3. In a motor car having a windshield the combination of a fan or the like for forcing a cooling blast of air over the heated motor, means for diverting a portion of the air blast, means for super-heating the diverted portion, means for accelerating said diverted portion of super-heated air and for directing said portion in a sheet-like stream across the outer surface of the windshield.

4. In a motor car having a windshield the combination of means for forcing a cooling blast of air over the motor, means for further heating a portion of said blast of air, and means for directing the heated portion in a sheet-like stream across the exterior surface of the windshield.

5. In a motor car having a windshield the combination of means for forcing a cooling blast of air over the motor, means for directing a portion of said blast of air into more intimate contact with the hotter portions of the motor, and means for directing the heated portion in a sheet-like stream across the exterior surface of the windshield.

In testimony whereof, I have signed my name to this specification.

JOHN D. MORGAN.